Jan. 3, 1967 V. R. GLUTH 3,295,157
BEARING AND SPRING LINK FOR DOOR ACTUATORS
Filed Aug. 4, 1964 2 Sheets-Sheet 1
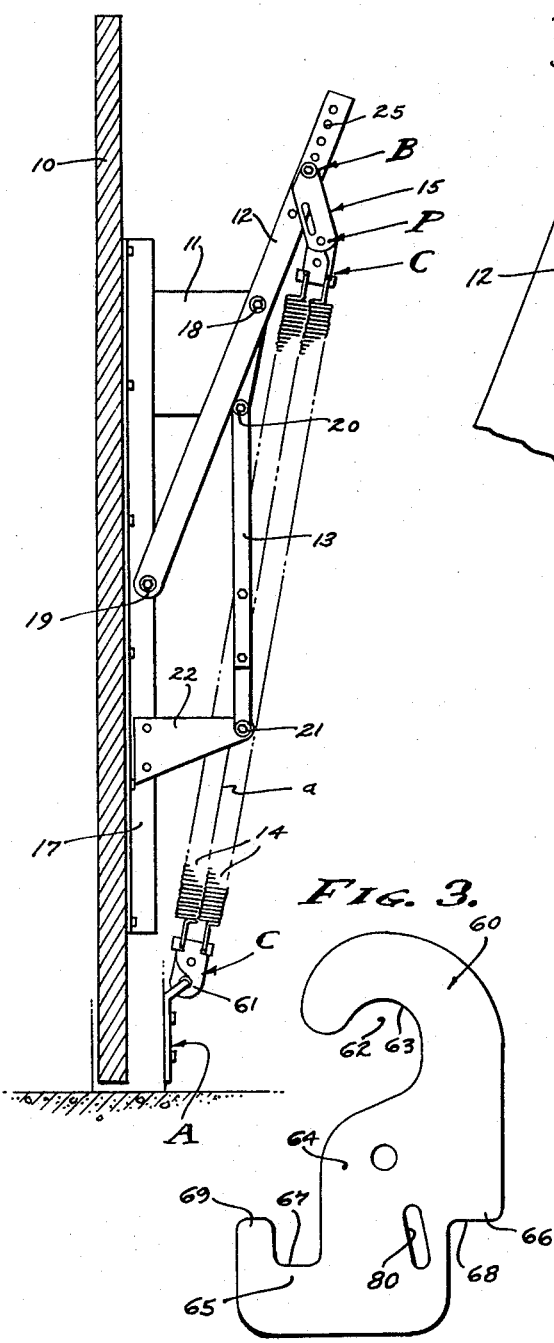
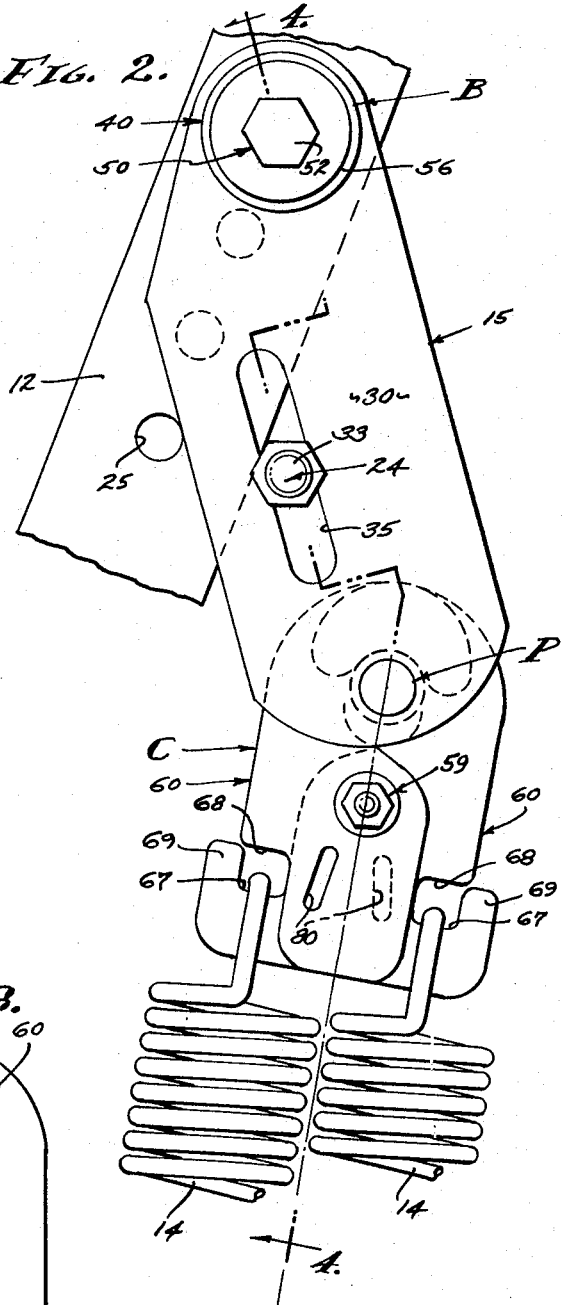
INVENTOR.
VERNON R. GLUTH
BY
W. A. Maxwell
AGENT Jan. 3, 1967   V. R. GLUTH   3,295,157
BEARING AND SPRING LINK FOR DOOR ACTUATORS
Filed Aug. 4, 1964   2 Sheets-Sheet 2
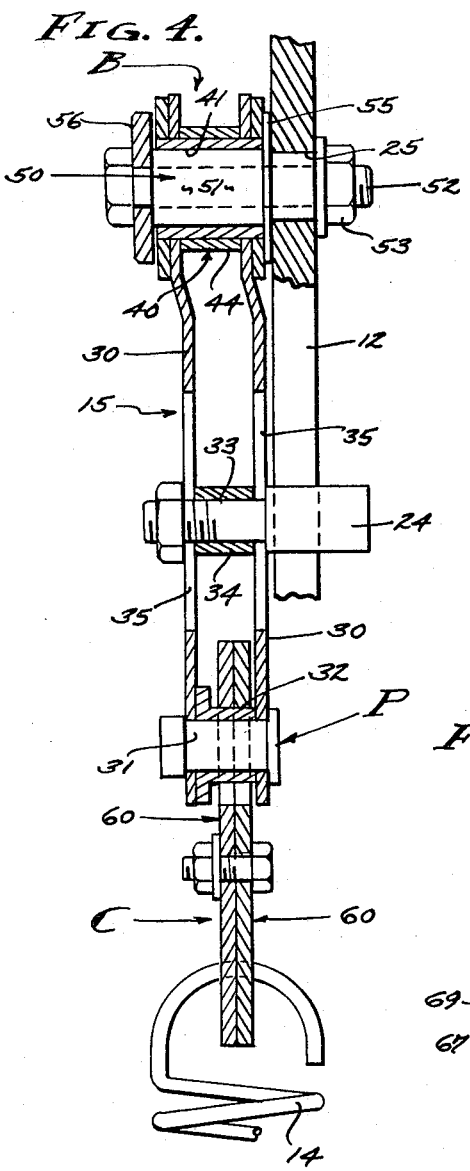
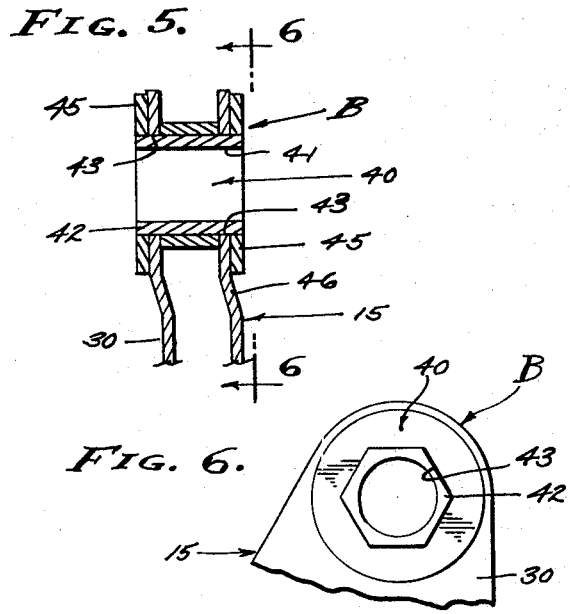
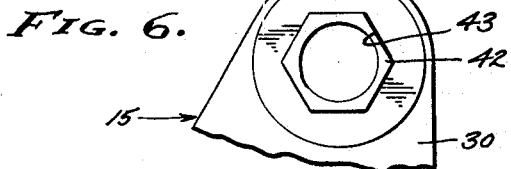
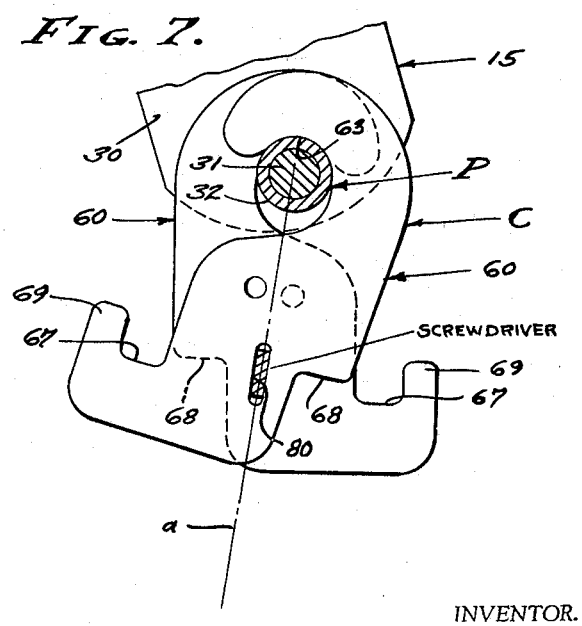
INVENTOR.
VERNON R. GLUTH
BY
AGENT

United States Patent Office 3,295,157
Patented Jan. 3, 1967

3,295,157
BEARING AND SPRING LINK FOR
DOOR ACTUATORS
Vernon R. Gluth, Los Alamitos, Calif.
(8378 Katella Ave., Stanton, Calif. 90680)
Filed Aug. 4, 1964, Ser. No. 387,324
3 Claims. (Cl. 16—1)

This invention relates to garage door hardware or the like and is particularly concerned with door supporting and lifting mechanisms wherein substantial force is exerted by spring tension, it being a general object of this invention to provide safe bearing and spring link engagement for the various moving parts of such hardware mainly in connection with the springs thereof.

This invention is primarily concerned with garage door hardware and specifically with actuators that support and assist operation of such doors between a closed and opened position. Actuators of this type vary according to engineering design and are usually characterized by lengthy helical tension springs linked to lever arms in order to assist lifting of the door from a closed to an opened position. In the interest of manufacturing a relatively inexpensive product, these units of door hardware are usually made of parts having minimum cross sections but apparently sufficient to withstand the strains involved. However, these units are also characterized by heavy springs and are subjected to rapid wear at the bearing points and at the spring connections, and with the result that it is not uncommon for failure of the units to occur. Specifically, the failures which do occur are in the bearing engagements and in the spring connections, caused for the most part by using thin light-weight cross sections of soft metal in the initial construction. Concerning bearings per se; the usual bearing is for example a ⅜ inch diameter pin rivet or bolt made of ordinary low carbon steel inserted into a bearing opening in ¼ to ⅜ inch ordinary low carbon steel. Concerning spring connections per se; the usual spring connection is simply a hook made of ordinary steel wire, and in some instances hooks are made of ordinary sheet steel. The significant factors are that the ordinary steel which is used is relatively soft and with the result that the spring tension of several hundred pounds or more pull causes the bearings to gall and eventually fail. Similarly, the movement of the spring hooks causes the hooks and/or hook connections to gall and/or cut and eventually fail.

The foregoing points out the usual prior art construction for door actuators of the type under consideration and which results in failure in many instances, and in a surprisingly short length of time. This expected failure can cause great havoc and can be extremely dangerous, since the several springs are large and under considerable stress. Furthermore, as and when a sufficient weakness develops, the actuator failure will usually occur when a person is present and operating the door. There are other deficiencies which need not be considered in detail and for instance result in the release of springs, all of which can lead to extensive damage as the springs suddenly release energy without direction or restraint.

An object of this invention is to provide a bearing and spring link in a door actuator whereby relative rotation is confined to parts of the bearing and not permitted to occur indiscriminately in the parts connected by the link. Heretofore, relatively thin plates of metal have been relied upon for rotative bearing engagement, and it is this type of bearing which is eliminated by the present invention. With the structure hereinafter described any thin plates have static bearing engagement while the rotation is confined to bearing parts of substantial diameter and axial extent.

An object of this invention is to provide a bearing spring link in a door actuator whereby the springs are releasably captured in connected condition and cannot be accidentally released, and whereby the breakage of a spring cannot cause its release and cannot cause the release of other springs and/or associated parts. Heretofore, hooked connections have been relied upon and spring breakage has resulted in release not only of the broken spring but also of the adjoining spring (springs usually being employed in pairs). With the structure hereinafter described, the spring or springs are captured in a connected condition and cannot be accidentally released, all with the application of a single fastener.

Another object of this invention is to provide a bearing and spring link of the character thus far referred to and which involves a pair of spring couplers that are movable relative to each other between two positions, one an open position where it can be held by a tool so as to freely receive spring parts, and one a closed position where it can be locked.

The various objects and features of this invention will be fully understood from the following detailed description of the typical preferred form and application thereof, throughout which description reference is made to the accompanying drawings, in which:

FIG. 1 is a sectional view showing a typical garage door installation employing the bearing and spring link. FIG. 2 is an enlarged view of the bearing and spring link shown in FIG. 1. FIG. 3 is a detailed view of one of a pair of identical hook plates which characterizes the invention. FIG. 4 is a sectional view taken as indicated by line 4—4 on FIG. 2. FIG. 5 is a fragmentary view of a portion of the structure shown in FIG. 4. FIG. 6 is a view taken as indicated by line 6—6 on FIG. 5, and FIG. 7 is a view of the hook plates of FIG. 2 and showing the positioning thereof for reception of springs.

In the drawings I have shown a typical garage door actuator, it being understood that a pair of like units is employed with one unit at each side of the door 10. The door 10 is a flat panel suitably fabricated of construction materials and typically of 7 foot height and 16 foot width. The actuator units are like left and right hand units and each involves generally a support bracket 11, support arm 12, a guide arm 13, springs 14, and a bearing and spring link 15. Also, there is an anchor A for the springs 14, and there is a rail 17 for supportably carrying the door 10.

Door hardware of the type under consideration varies in geometry, the door hardware shown being typical and wherein the springs 14 are extended and tensioned as the door 10 is lowered and wherein the guide arm 13 positions the door 10 in a vertical plane when in the lowermost position. The door 10 is carried by the arms 12 and 13 about midway of its height with all of said hardware installed at the back-side of the door. The support arm 12 is pivoted to the bracket 11 at 18 and has a forwardly extended portion pivoted to the rail 17 at 19 and it has a rearwardly extended portion pivotally coupled to the springs 14 by the bearing and spring link 15 of the present invention. The guide arm 13 is pivoted at 20 to the bracket 11 below and slightly forward of the pivot 18 and is extended forwardly to a pivot 21 at rail 17. The pivots 19 and 21 are vertically spaced (when the door 10 is closed) and the pivot 21 is positioned rearwardly of pivot 19 as by means of a projected ear 22. As a result of this general type of geometry, lifting of the door 10 is assisted by tensioning of springs 14, said springs 14 being secured by the anchor A placed at or near the floor level.

With the mechanism described generally above the arm 12 and its rearwardly extended portion is pierced by a series of adjustment openings 25 provided for the reception of means to couple to the springs 14. Further, it is usual practice to employ a pair of identical springs 14, arranged adjacently side by side. Thus, the springs 14 will normally pull in a straight line between an opening 25 and the anchor A. However, it is customary to hold the springs away from the lever 12 and to thereby increase leverage when the door 10 is closed. This is accomplished by a link connection between the springs 14 and said lever 12 and by employing a stop pin 24 that maintains an angular relationship betwen the lever 12 and said link. Therefore, the bearing and spring link 15 that I provide includes this feature and has the stop pin 24 which is adjustable in a slot as circumstances require.

In accordance with the invention the bearing and spring link 15 is a stirrup-shaped fabrication characterized by a pair of plates 30 with bearing means B at one end and with a spring pin P at the other end. The stop pin 24 is positioned intermediate the means B and pin P, each of these three elements being disposed on spaced parallel axes. Also, these three elements, the stop pin 24, means B and pin P are in the nature of parts which separate the two plates 30 and so that the said plates remain spaced and parallel. It is a stirrup-shaped link composed of these two plates held spaced by posts, with which the present invention is primarily concerned. However, instead of said plates 30 stradling the arm 12, the entire bearing and spring link 15 is disposed at one side of the said arm 12 in order to provide a bearing with improved features.

The pin P is essentially a spacer and anchor part for coupling to the live end of springs 14. It is preferably a shouldered rivet or the like or as shown it is a rivet 31 that is passed through a spacer sleeve 32, and headed in order to secure the two plates together in pressure engagement against opposite ends of the sleeve 32.

The stop pin 24 is essentially a movable spacer that projects from one plate 30 in order to present a stop engageable with an edge of the arm 12. It is preferably a bolt 33 with a pin-shaped head projecting from one plate 30 and with spacer sleeve 34 clamped between the said plates. The plates 30 are identical and with aligned slots 35 to pass the shank of the bolt 33 and so that the stop pin 24 is movable between the means B and pine P, as shown.

In accordance with the invention I provide the bearing B to pivot one end of the link 15 to the arm 12 whereby the end at pin P is free to swing as limited by the stop pin 24. The bearing B involves two assemblies, one assembly 40 fixed with respect to the link 15, and one assembly 50 fixed with respect to the arm 12, whereby relative rotation of said two assemblies is assured. As a result, the engagement of the plates 30 with the assembly 40 is static there being absolutely no relative movement, while the engagement of the assembly 50 with the arm 12 is also static and without relative movement.

The assembly 40 can vary in detail of design and is a part of substantially large diameter extending between the two plates 30 and characterized by a central bore 41 therethrough on a axis normal to the plates. It is essential to the invention that the assembly 40 does not turn relative to the plates 30 and to this end it is keyed thereto. I prefer to form the part 42 of polygonal bar stock and to punch like polygonal openings 43 through the two plates 30. The part 42 is surrounded by a spacer sleeve 44 that extends between the plates 30 in order to properly space them. In practice, the part 42 is of an axial extent to project beyond the outside planes of the two plates 30 where heads 45 are pressed or otherwise secured onto the opposite end portions of said part 42. The heads 45 are of limited axial extent being in the nature of washers, pressed with sufficient interference fit so as to be permanently installed when positioned as prescribed. Alternatively, the end portion of part 42 can be flush with the outside faces of the plate 30, in which they are pressed into the openings in the plates. Thus, the assembly 40 is permanently fixed onto the plates 30 and cannot rotate relative to the link 15 with the bore 41 opening through the link on a transverse horizontal axis.

In practice, the link plates 30 are joggled at 46 an amount about equal to the thickness of the head 45, in order that the link 15 will be disposed closely to the arm 12.

The assembly 50 can also vary somewhat in detail of design and is essentially a bearing stud 51 that is fixed to the arm 12 in one of the openings 25 and that projects into the bore 41 in the assembly 40 fixed to the link 15. In practice, there are advantages to be gained in making the bearing engagement diameter substantially large and as shown the bore 41 is ⅝ inch diameter, in which case the bearing stud 51 is a machine part with a central opening to receive a standard fastener in the form of a bolt 52 with a nut 53 threadedly engaged thereon so as to clamp the stud 51 onto the arm 12. In the preferred form the stud has a flange 55 that seats onto the arm 12, and there is a washer 56 at the opposite end of the stud to retain the assembly 40. The axial extent of the bearing portion of stud 51 is slightly greater than that of the bore 41, whereby the washer 56 and stud 51 can be clamped tightly without binding the link 15, to the end that the link is free to swing.

In accordance with the present invention the bearing and spring link 15 is provided with a coupler C that releasably locks the link 15 to one or a pair of springs 14. It is the free end of the link 15 which carries the pin P and to which the spring or springs 14 are to be coupled, and it is rivet 31 and/or sleeve 32 which is engaged by the coupler C, said rivet and/or sleeve being round. As shown, the coupler C involves two like and preferably identical hook places 60 and a fastener 59, said plates being stamped of sheet material. In describing the coupler C I will relate it to a tension axis $a$ that extends between the pin P and the anchor A, this being the axis of pull normally created by a pair of like or identical springs 14.

The anchor A can vary in design and can be made somewhat like the link 15, being characterized by an anchor pin 61 disposed on a horizontal axis spaced from and parallel to the axis of pin P. As is shown, the anchor A is fastened securely to the building structure at or near the floor level, with the anchor pin 61 horizontally disposed.

The hook plates 60 are preferably identical and each involves a throat 62 engageable over the pin P or pin 61, as the case may be. The throat 62 terminates in an arcuate seat 63 curved about a center that is coincidental with the axis of either pin P or pin 61, the throat being faced toward the spring or springs to be coupled and opening laterally to one side of the plate. As shown, the tension axis $a$ bisects the seat 63 and extends in a direction diametrically through the said axis of pin P or pin 61, and the plate 60 is characterized by a shank 64 extended toward the spring or springs and along said axis $a$ remotely spaced from the seat 63. The said shank 64 is equally disposed at either side of said axis $a$ and carries a spring support 65 at one side thereof and a spring stop 66 at the other side thereof. The said support 65 and stop 66 of the two plates are cooperatively operative when the two plates are adjacently positioned and related reversely relative to each other.

The shank 64 is essentially a straight elongate portion disposed along the axis $a$; the spring support 65 involving a shoulder 67 that projects normally from one side of the shank 64; while the spring stop 66 involves a shoulder 68 that projects normally from the other side of the shank 64. The two shoulders are disposed in spaced opposed planes, whereby a spring part or loop will be adequately accommodated therebetween. As shown, the support shoulder 67 faces the seat 63 and there is a retaining lug 69 that extends from the shoulder 67, toward the seat 63, and to the plane of said shoulder 66, said lug 69 being spaced from the shank 64 to accommodate a spring part or loop. As clearly shown, the stop shoulder 68 extends laterally a distance about equal to the outward spacing of said lug 69.

With the hook plates 60 formed as hereinabove described a spring part or spring loop can be engaged on the support shoulder 67, and when tension is applied by the spring 14, force is exerted directly along axis $a$ to the seat 63. A feature of the present invention is that I advantageously employ two coupler plates 60 that are moveable between two positions relative to each other; one an opened position where they are receptive to the spring parts or loops; and one a closed position where they lock the spring parts or loops in a working position. These two positions are clearly shown in FIGS. 7 and 2.

From FIGS. 7 and 2 it will be seen that the two plates 60 revolve independently about the center of their seats 63 on the axis of pin P or pin 61. Therefore, the first mentioned receptive position is maintained by providing an opening 80 in each plate 60 said openings 80 being placed on the axis $a$ and in alignment with each other when the support shoulder 67 of one plate is laterally displaced outside the stop shoulder 68 of the other plate. These openings 80 are preferably slot-shaped openings in order to receive the end of an ordinary screwdriver or the like. With a tool such as a screwdriver inserted into the slot-shaped openings 80, the plates 60 and the coupler C are held open for the independent reception of two adjacent springs 14.

Having attached the springs as above described at pins P and 61, the said tool is removed from openings 80 whereby the pull of the springs 14 rotates the plates 60 to the second mentioned position shown in FIG. 2. In accordance with the invention, the plates 60 are locked in this operative position by means of a single fastener 59, for example a threaded screw fastener, passed through the two plates on the axis $a$. Since the two plates inherently revolve to the operative position it is a simple matter to insert the lock fastener 59.

From the foregoing, it will be apparent that the rotative movements involved are confined to parts of considerable axial extent and with virtually no danger of cutting or galling. The various bearing parts of the link structure hereinabove described can be formed and heat treated as circumstances require, each part being suitably shaped so as to facilitate heat treatment. Further, the spring or springs are captured in operative positions so that there is no danger of their accidental release, while their initial assembly is greatly facilitated with awkward manipulation of the springs virtually eliminated.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A bearing and spring link for a door actuator wherein the door is carried between opened and closed positions by an arm biased by a spring, and including:
    (a) a link comprised of a pair of spaced plates, to be pivoted to the arm and with its free end coupled to the spring;
    (b) a bearing revolubly attaching the link plates pivotally to the arm and comprising;
        (1) a bearing stud fixed on and projecting from one side of the arm;
        (2) and a bearing part pressed through openings in the spaced plates, there being a spacer sleeve surrounding the bearing part and engaging the plates to space the same, and having a bore rotatably receiving this first mentioned bearing stud;
    (c) whereby relative rotational engagement is confined to said first mentioned bearing in said bore.

2. A bearing and spring link for a door actuator wherein the door is carried between opened and closed positions by an arm biased by a spring, and including:
    (a) a link comprised of a pair of spaced plates, to be pivoted to the arm and with its free end coupled to the spring;
    (b) a bearing revolubly attaching the link plates pivotally to the arm and comprising;
        (1) a bearing stud fixed on and projecting from one side of the arm;
        (2) and a bearing part projected through openings in the spaced plates, there being a spaced sleeve surrounding the bearing part and engaging the plates to space the same, there being heads on the bearing part at the outsides of the plates to retain the plates engaged with the spaced sleeve, and having a bore rotatably receiving the first mentioned bearing stud;
    (c) whereby relative rotational engagement is confined to said first mentioned bearing in said bore.

3. A coupler link for extension between a bearing end at least one of two spaced elements pulling away from said bearing, and including a pair of like coupler plates positioned adjacent and disposed opposite relative to each other and each comprising:
    (a) a hook portion with a seat faced in the direction of the pull axis and engaged on said bearing, each of said plates being revoluble at said seated engagement on said bearing;
    (b) a shank disposed along said axis;
    (c) a pull element support shoulder at one side of the shank, and a pull element stop shoulder at the other side of the shank, there being a lug projecting from the support shoulder in spaced relation to the shank;
    (d) said shoulders being disposed in spaced planes when the two plates are in a normally operative position and whereby the stop shoulder of one plate opposes the support shoulder of the other plate, and whereby revolvement of the two plates by spreading the shanks apart withdraws the stop shoulder of one plate from said opposition with respect to the support shoulder of the other plate;
    (e) and two spaced openings in each of the shanks, with one opening in each shank being in alignment when the support shoulder of one plate is laterally outside the stop shoulder of the other plate, the other opening in each shank being in alignment when the stop shoulder of one plate overlies the support shoulder of the other plate, and thereby to hold the plates in said two relatively rotated positions.

References Cited by the Examiner

UNITED STATES PATENTS

| | | | |
|---|---|---|---|
| 52,809 | 2/1866 | Acker | 287—93 |
| 1,455,330 | 5/1923 | Fordyce | 24—242 |
| 2,316,510 | 4/1943 | Ferris et al. | |
| 2,516,196 | 7/1950 | Fowler | 16—129 |

EDWARD C. ALLEN, *Primary Examiner.*

J. H. McGLYNN, *Assistant Examiner.*